Patented Nov. 19, 1940

2,222,384

UNITED STATES PATENT OFFICE 2,222,384

THERAPEUTIC COMPOSITION

Albert B. Scott, Douglaston, Long Island, N. Y., and Oswald M. Gruhzit and James A. Sultzaberger, Detroit, Mich., assignors to Parke, Davis & Company, Detroit, Mich., a corporation of Michigan No Drawing. Application August 21, 1937, Serial No. 160,353

10 Claims. (Cl. 167—69)

The invention relates to new therapeutically valuable and pharmaceutically practicable compositions comprising 3-amino-4-hydroxy phenyldihalo arsine hydrohalides.

3-amino-4-hydroxy phenyldihalo arsine hydrohalides, specifically the dichloroarsine hydrochloride and diiodo arsine hydroiodide, have already been described. However, they are known to be so acid in character as to be unsuited for therapeutic use by injection.

We have now found that surprisingly stable and therapeutically effective dry mixtures, which are also non-irritating when used, may be made with 3-amino-4-hydroxy phenyldihalo arsine hydrohalides and solid non-toxic inorganic basic or alkaline substances in quantities capable, when in aqueous solution, of reacting with and neutralizing, in whole or in part, the acidic halogen groups of the dihalo arsine hydrohalides. This is an entirely unexpected finding. Trihalo arsines, such as trichloro arsine (arsenic trichloride), are known to be readily reactive to alkaline or basic substances. The arsenic compounds used in our invention differ from compounds such as arsenic trichloride only in that one of the halogen atoms of the latter is replaced by an organic radical. Not only do the compounds of this invention contain two acidic halogen atoms attached to the arsenic, but they also contain a third acidic halogen group, the hydrohalide group, attached at the amino radical of the 3-amino-4-hydroxy phenyldihalo arsine compound. Furthermore, in spite of the presence in the compounds which we use of three acidic halogen groups, we have also found that our dry mixtures of dihalo arsine hydrohalides with neutralizing agents have even greater stability than do corresponding mixtures where the arsenic compound is a 3-amino-4-hydroxy phenyl arsinoxide hydrohalide having no acidic halogens attached to arsenic, but a neutral oxygen atom instead.

In preparing our compositions we prefer to use a very pure form of dihalo arsine hydrohalide prepared by a new method. In copending application of Albert B. Scott and James A. Sultzaberger, Serial No. 160,349, filed August 21, 1937, there is described purified 3-amino-4-hydroxy phenylarsine oxide. In copending application of Albert B. Scott, Ralph D. Humel, Benjamin F. Tullar and Joseph Wainwright, Serial No. 160,350 there is described crystalline 3-amino-4-hydroxy phenylarsine oxide. We have found that this pure oxide, and especially the crystalline variety, can be reacted directly with hydrohalide acid to obtain good yields of very pure crystalline dihalo arsine hydrohalide.

The invention may be illustrated by the following examples.

Example 1

20 cc. of water and 2.5 cc. of concentrated pure hydrochloric acid are added with cooling to 6 grams of pure crystalline 3-amino-4-hydroxy phenylarsine oxide hydrate, prepared as described in copending application of Albert B. Scott, Ralph D. Humel, Benjamin F. Tullar and Joseph Wainwright, Serial No. 160,350, filed August 21, 1937. The almost colorless solution is filtered rapidly through a cotton plug and then 50 cc. of concentrated pure hydrochloric acid is added to the filtrate. After the crystal mass stands for one hour in an ice bath the irregular white crystals are filtered off, washed with glacial acetic acid and dry ether. The crystals are then dried over night in a vacuum desiccator containing sodium hydroxide.

Anal. calc. for $C_6H_7ONCl_3As$; $As^{III}$, 25.8; Cl, 36.6%. Found: $As^{III}$, 25.8; Cl, 36.4%.

The trivalent arsenic ($As^{III}$) is determined by dissolving the sample in water and titrating directly with N/20 iodine solution. The chlorine is titrated as hydrochloric acid with N/10 sodium hydroxide, using bromthylmol blue as an indicator.

100 grams of 3-amino-4-hydroxy phenyldichloro arsine hydrochloride prepared as above is mixed uniformly with 60 grams of dry powdered sodium carbonate ($Na_2CO_3$). The mixture is stable and when dissolved in water can be used therapeutically by injection without irritation. The mixture is so stable that it can even be put up in ampoules in the presence of air without danger of the product deteriorating before use. When this mixture, or an analogous mixture containing other dihalo arsine hydrohalides, has water added to it a therapeutically effective and substantially neutral solution of 3-amino-4-hydroxy phenylarsine oxide is obtained. Dry sodium chloride may also be incorporated with this mixture in amounts such that a quantity of the mixture giving a therapeutic dosage of arsenical will, when dissolved in a suitable volume of water for injection, give a non-hemolytic or an isotonic solution capable of being injected intravenously.

Example 2

25 cc. of water and 3 cc. of hydrobromic acid (boiling point, 125° C. at 731 mm. pressure of mercury) are added to 5 grams of pure 3-amino- 4-hydroxy phenylarsine oxide. The almost colorless solution is filtered rapidly through a cotton plug and 75 cc. of hydrobromic acid added. After allowing the reaction mixture to stand an hour in an ice bath, the large white glittering spear-shaped crystals of 3-amino-4-hydroxy phenyldibromo arsine hydrobromide are filtered off, washed with glacial acetic acid and dry ether and dried over night in a vacuum desiccator containing sodium hydroxide. The yield is about 80%.

Anal. calc. for $C_6H_7ONBr_3As$: $As^{III}$, 17.7%; Br, 56.6%. Found: $As^{III}$, 17.65%; Br, 56.4%.

The product is a new chemical substance never before described. It resembles the corresponding chloro compound in properties and can be made up into stable therapeutically useful dry mixtures in the same manner as was described for the dichloro compound of Example 1.

Example 3

2 grams of pure 3-amino-4-hydroxy phenylarsine oxide are powdered and added to 50 cc. of 50% hydriodic acid and 25 cc. of water. An oily precipitate is obtained which is stirred and allowed to stand over night in an ice box. The yellow prisms of 3-amino-4-hydroxy phenyl diiodo arsine hydroiodide thus obtained are filtered off and washed with glacial acetic acid and dry ether. After drying, the crystals analyzed almost the theoretical amount of iodine and trivalent arsenic for $C_6H_7ONI_3As$. This diiodo hydroiodide, like the corresponding chlorine and bromine derivatives, can be prepared in the same way in the form of stable therapeutically useful dry mixtures.

The above examples are merely given by way of illustrating the invention and are not intended to limit it to the details of the examples or the exact materials used therein. The invention in its broader features embodies many variations in materials and procedures. For example, any solid non-toxic inorganic basic or alkaline substance can be used in the mixtures of this invention provided sufficiently basic or alkaline to be capable of reacting in aqueous solution with at least part of the halogen groups of the dihalo arsine hydrohalide. For example, although suitable mixtures containing the arsenical with sodium carbonate and sodium chloride as a diluent are preferred, other neutralizing agents may be used. For example, alkaline or basic potassium salts, alkaline earth metal salts, such as the calcium strontium, magnesium and even barium salts or compounds may be used. Obviously, it is possible to use a potassium or barium or other salt in a composition to be applied topically or as a mouth wash, for example in treating Vincent's angina, where the same alkaline substance would be too toxic for use in certain types of injections, such as intravenous injection.

The dihalo arsine hydrohalides used may be represented by the following general formula,

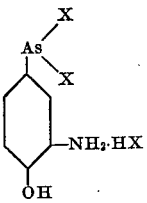

where X is the same or a different halogen atom in each instance. It will be seen that the invention contemplates the use of mixed types of compounds where one mole of the 3-amino-4-hydroxy phenylarsine oxide is first reacted with one or two equivalents of one hydrohalide acid and thereafter reacted with one or two, as the case may be, moles of some other hydrohalide acid. For example, by reacting one mole of 3-amino-4-hydroxy phenylarsine oxide with one mole of hydrochloric acid and then reacting the product thereby obtained with two moles of a second hydrohalide, or an equimolecular mixture of two other hydrohalides, mixed dihalo arsine hydrohalides are obtained and may be made up in stable dry mixture with alkaline substances in the same way as described for the examples.

What we claim as our invention is:

1. A mixture comprising 3-amino-4-hydroxy phenyldihalo arsine hydrohalic compound and a quantity of a solid non-toxic inorganic basic compound capable of reacting with and neutralizing at least one of the acidic halogen groups of said hydrohalic compound in aqueous solution thereby forming a therapeutically useful product.

2. A mixture comprising 3-amino-4-hydroxy phenyldichloro arsine hydrochloride and a quantity of a solid non-toxic inorganic basic substance capable of reacting with and neutralizing at least one of the chlorine groups of said hydrochloride in aqueous solution thereby forming a therapeutically useful product.

3. A mixture comprising 3-amino-4-hydroxy phenyldichloro arsine hydrochloride and a quantity of a solid non-toxic inorganic basic compound capable of reacting with said hydrochloride in aqueous solution to form a therapeutically useful solution of 3-amino-4-hydroxy phenylarsine oxide.

4. A mixture comprising one molecular proportion of 3-amino-4-hydroxy phenyldichloro arsine hydrochloride, sodium chloride, and a quantity of sodium carbonate capable of reacting with said hydrochloride in aqueous solution to form a therapeutically useful solution of 3-amino-4-hydroxy phenylarsine oxide.

5. A mixture comprising 3-amino-4-hydroxy phenyldibromo arsine hydrobromide and a quantity of a solid non-toxic inorganic basic substance capable of reacting with and neutralizing at least one of the bromine groups of said hydrobromide in aqueous solution thereby forming a therapeutically useful product.

6. A therapeutically useful drug comprising solid 3-amino-4-hydroxy phenyldichloro arsine hydrochloride and a solid non-toxic inorganic basic compound in amount sufficient to neutralize said hydrochloride, said drug being in the form of a comminuted mixture of unreacted solid substances adapted when dissolved in water to form a therapeutically useful solution of 3-amino-4-hydroxy phenylarsine oxide.

7. A pharmaceutical preparation comprising a comminuted stable mixture of a solid 3-amino-4-hydroxy phenyldihalo arsine hydrohalic compound and a solid non-toxic basic compound in amount sufficient to neutralize said hydrohalic compound when said mixture is dissolved in water to form a therapeutically useful solution of 3-amino-4-hydroxy phenylarsine oxide.

8. A pharmaceutical preparation comprising a comminuted stable mixture of a solid 3-amino-4-hydroxy phenyldichloro arsine hydrochloric compound and a solid non-toxic basic compound in amount sufficient to neutralize said hydrochloric compound when said mixture is dissolved in water to form a therapeutically useful solution of 3-amino-4-hydroxy phenylarsine oxide.

9. A pharmaceutical preparation comprising a comminuted stable mixture of a solid 3-amino-4-hydroxy phenyldibromo arsine hydrobromic compound and a solid non-toxic basic compound in amount sufficient to neutralize said hydrobromic compound when said mixture is dissolved in water to form a therapeutically useful solution of 3-amino-4-hydroxy phenylarsine oxide.

10. A pharmaceutical preparation comprising a comminuted stable mixture of a solid 3-amino-4-hydroxy phenyldiiodo arsine hydriodic compound and a solid non-toxic basic compound in amount sufficient to neutralize said hydriodic compound when said mixture is dissolved in water to form a therapeutically useful solution of 3-amino-4-hydroxy phenylarsine oxide.

OSWALD M. GRUHZIT.
JAMES A. SULTZABERGER.
ALBERT B. SCOTT.